United States Patent
Yamamoto et al.

(10) Patent No.: US 9,015,218 B2
(45) Date of Patent: Apr. 21, 2015

(54) RANDOM NUMBER GENERATOR, ENCRYPTION DEVICE, AND AUTHENTICATION DEVICE

(71) Applicant: Fujitsu Limited, Kawasaki-shi, Kanagawa (JP)

(72) Inventors: Dai Yamamoto, Kawasaki (JP); Kouichi Itoh, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 13/626,221

(22) Filed: Sep. 25, 2012

(65) Prior Publication Data

US 2013/0022197 A1    Jan. 24, 2013

Related U.S. Application Data

(63) Continuation of application No. PCT/JP2010/002228, filed on Mar. 26, 2010.

(51) Int. Cl.
*G06F 7/58* (2006.01)
*H04L 9/08* (2006.01)

(52) U.S. Cl.
CPC ............... *G06F 7/58* (2013.01); *H04L 9/0869* (2013.01); *G06F 7/588* (2013.01)

(58) Field of Classification Search
CPC ................................. G06F 7/58; G06F 7/588
USPC ................................................ 708/250, 255
See application file for complete search history.

(56) References Cited

U.S. PATENT DOCUMENTS

| 6,631,390 B1 | 10/2003 | Epstein |
| 7,113,966 B2 | 9/2006 | Epstein |
| 7,249,108 B1 * | 7/2007 | Walmsley et al. ............... 705/64 |
| 2003/0061250 A1 | 3/2003 | Fujita et al. |
| 2003/0149863 A1 * | 8/2003 | Henry et al. .................. 712/225 |
| 2003/0236802 A1 | 12/2003 | Epstein |
| 2004/0267845 A1 | 12/2004 | Hars |
| 2007/0244951 A1 * | 10/2007 | Gressel et al. ................ 708/252 |

FOREIGN PATENT DOCUMENTS

| JP | 2003-131867 | 5/2003 |
| JP | 2003-173254 | 6/2003 |

(Continued)

OTHER PUBLICATIONS

Extended European Search Report dated Nov. 24, 2014 in corresponding European Patent Application No. 10848323.1.

(Continued)

*Primary Examiner* — Chuong D Ngo
(74) *Attorney, Agent, or Firm* — Staas & Halsey LLP

(57) ABSTRACT

A random number generator includes an exclusive-OR circuit, a random number determiner, and a random number generation instruction inhibitor. The exclusive-OR circuit obtains an exclusive-OR of outputs from a number of digital circuits. The random number determiner determines whether or not an output generated according to an instruction to generate random numbers is a random number for each of the digital circuits. The random number generation instruction inhibitor inhibits an instruction to generate random numbers to be provided to the digital circuits whose output generated according to the instruction is determined to be not a random number by the random number determiner.

11 Claims, 12 Drawing Sheets

(56) References Cited

FOREIGN PATENT DOCUMENTS

| | | |
|---|---|---|
| JP | 2003-526151 | 9/2003 |
| JP | 3604674 | 10/2004 |
| JP | 2004-537119 | 12/2004 |
| JP | 2005-530270 | 10/2005 |
| JP | 2010-39838 | 2/2010 |

OTHER PUBLICATIONS

Maiti et al., "Physical Unclonable Function and True Random Number Generator: a Compact and Scalable Implementation", Proceedings of the 19$^{th}$ ACM Great Lakes Symposium on VLSI, Jan. 2009, 4 pp.

Brar et al., "True Random Number Generators", Course Cryptography and Computer Network-Security ECE646, Fall 2007, 5 pp.

International Search Report of Corresponding PCT Application PCT/JP2010/002228 mailed Jun. 15, 2010.

International Preliminary Report on Patentability mailed Nov. 1, 2012, issued in corresponding PCT Patent Application No. PCT/JP2010/002228.

* cited by examiner

| S | R | Q | $\overline{Q}$ |
|---|---|---|---|
| 0 | 0 | Q | $\overline{Q}$ |
| 0 | 1 | 0 | 1 |
| 1 | 0 | 1 | 0 |
| 1 | 1 | 1 | 1 |

) INHIBITED INPUT

RELATED ART

FIG. 1B

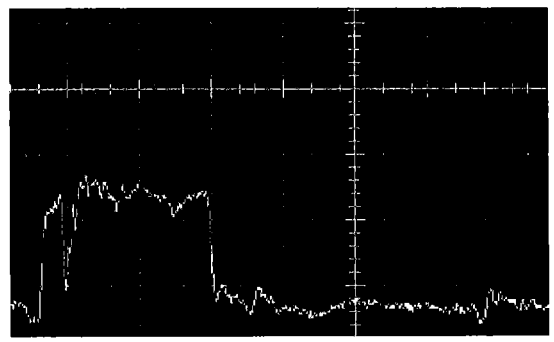
F I G. 7

RANDOM NUMBER GENERATOR, ENCRYPTION DEVICE, AND AUTHENTICATION DEVICE

CROSS-REFERENCE TO RELATED APPLICATIONS

This application is a continuation application based on International Application No. PCT/JP2010/002228, filed on Mar. 26, 2010, the entire contents of which are incorporated herein by reference.

FIELD

The embodiments of the present Description discussed herein are related to a technique of generating random numbers.

BACKGROUND

It is predicted that as the information society develops, services in which information networks are used such as electronic payment or a basic resident register network will be widespread. In order to manage such services securely, information security technology is essential.

As basic information security technology, several types of cryptographic methods are used. The cryptographic methods are broadly divided into public key cryptography and common key cryptography. The public key cryptography is a system in which different keys are used for the encryption and decryption of the information. In the public key cryptography, the security is ensured by keeping a key used for decrypting a cryptogram (secret key) as the secret information for the recipient, while a key used for encryption (public key) is open to public. On the other hand, the common key cryptography is a system in which the same key is used for the encryption and decryption of the information in common. In the common key cryptography, the security is ensured by keeping the secret key as secret information from a third party excluding the recipient and sender.

The security of these cryptographic methods is dependent upon the confidentiality of a secret key. In other words, when the secret key is predicted by a third party in some way, the security of the cryptographic method may break down. Accordingly, random numbers are generally used to generate a secret key such that a third party cannot make predictions.

Random numbers are broadly divided into two, i.e., pseudo-random numbers and true random numbers (physical random numbers) depending on how they are generated.

The pseudo-random numbers refer to a part of the sequence of numbers generated by deterministic calculation, and are generated by feeding a seed to the pseudo-random number generation algorithm as an initial value. The pseudo-random numbers are logically predictable as long as its generation method (pseudo-random number generation algorithm) is known. What is more, when the initial value insider (aforementioned "seed") is known, it becomes even possible to make calculation in advance. For this reason, the safety of the cryptogram may be threatened when pseudo-random numbers are used to generate a secret key. However, there is an advantage that a dedicated device is not necessary to generate pseudo-random numbers because pseudo-random numbers are generated by calculation, and that even a general-purpose arithmetic unit or the like can generate pseudo-random numbers.

On the other hand, true random numbers (physical random numbers) are generated by making use of physical phenomenon that has intrinsically random property, for example, thermal noise in an electronic device. The random numbers generated in the way described above have no reproducibility, and thus such random numbers cannot be predicted by anybody. For this reason, the cryptography in which a secret key generated by using true random numbers is used has high security.

By the way, smart cards are known as the devices on the end user side when services such as electronic payment and basic resident register networks are used.

A smart card is equipped with an IC (integrated circuit) chip. A secret key given by a user is stored in a memory area inside the IC chip. Some IC chips of a smart card are equipped with a processor which provides several types of functions such as an encrypting function and a digital signature/authentication function. When such a function is used, a secret key of a user is used.

As described above, it is desirable that these secret keys be generated by using true random numbers for the high security. For this purpose, it is common practice that a handheld device such as the aforementioned smart card is provided with a random number generator which is dedicated to generate random numbers.

As one of such random number generators, a device which make use of a metastable in a digital circuit such as a latch circuit or a flip-flop circuit has been proposed.

Firstly, a metastable will be explained with reference to FIG. 1A and FIG. 1B.

FIG. 1A illustrates an example of the circuitry of an RS latch. The RS latch 10 is configured by NAND gates 11 and 12.

Inputs of the RS latch 10 are negative logic.

Note that in the present description, a high level in binary logic levels having different potentials is expressed as value "1", and a low level is expressed as value "0". In the drawings, a signal of negative logic is expressed by adding an over-bar on the signal name, but in the present description, a signal of negative logic is expressed by "#". Accordingly, for example, a set input of the RS latch 10 is expressed as "#S", and a reset input of the RS latch 10 is expressed as "#R".

A set input "#S" and an output of the NAND gate 12 are input as the two inputs of the NAND gate 11, respectively. Moreover, a reset input "#R" and an output of the NAND gate 11 are input as the two inputs of the NAND gate 12, respectively. An output of the NAND gate 11 becomes an output Q of the RS latch 10. An output "#Q" is output from the output of the NAND gate 12.

FIG. 1B is a truth table of the RS latch 10. In the truth table, a set input S and a reset input R are expressed by positive logic.

As understood from the truth table, in the RS latch 10, an output value is held just as it is when input S=0 and input R=0, and thus Q=Q and "#Q"="#Q". Moreover, in the RS latch 10, an output value is reset when input S=0 and input R=1, and thus Q=0 and "#Q"=1. Further, in the RS latch 10, an output value is set when input S=1 and input R=0, and thus Q=1 and "#Q"=0.

In the RS latch 10, logic of an output is stable as long as the combination of inputs is one of the combinations described above. However, in the RS latch 10, Q="#Q"=1 when input S=1 and input R=1. In other words, in this case, the logical value of Q and the logical value of "#Q" both become "1" even though it is essential that they indicate opposite logic. At this time, both the outputs of the RS latch 10 are in an unstable state where they are at an intermediate potential. Such an unstable state for digital circuits is called metastable. Generally, an input to the RS latch 10 where S=1 and R=1 is inhibited in order to avoid such a state of metastable.

Next, a random number generator in which such a metastable of the RS latch 10 is used will be explained with reference to FIG. 2A and FIG. 2B.

Firstly, FIG. 2A will be explained. FIG. 2A is the first example of the circuitry of a random number generator in which the RS latch 10 is used.

The random number generator 20 is configured such that a same value A will be input to both the set input "#S" and the reset input "#R" of the RS latch 10. Here, the output Q and the output "#Q" of the RS latch 10, which are the outputs of the random number generator 20, are indicated as B and C, respectively.

In the random number generator 20, both output B and output C become "1" when input A=0, where the output values are stable. However, when value A is changed from "0" to "1", the output becomes unstable as there will be a case in which output B is "1" and output C is "0" as well as a case in which output B is "0" and output C is "1". This is because the RS latch 10 is placed in a state of metastable and the output is in an uncertain state. The random number generator 20 uses this uncertainty to generate random numbers.

Next, FIG. 2B will be explained. FIG. 2B is an example of the input/output waveform of the random number generator 20, where the waveform of output B when an alternate signal of "0" and "1" (clock signal) are input as input A is illustrated.

When attention is given to the waveform of the output B, when input A is changed from "0" to "1" (i.e., when a clock signal is risen), the RS latch 10 falls into a state of metastable, and the value of output B falls in an unstable state. This state of metastable continues for certain period of time Td since a clock signal is risen. After that, the value of output B converges into "0" or "1", but it is uncertain into which of "0" or "1" the output B converges. The random number generator 20 uses the converged value of output B after a state of metastable as a result of random number generation.

Such a technique in which random numbers are generated by making use of a metastable of a digital circuit is widely known. However, there are several cases where no random number is generated as a matter of fact even if the random number generator 20 as configured as above is implemented.

Firstly, when there is difference in drive capability between the NAND gate 11 and the NAND gate 12, which configures the RS latch 10, the output value is biased to one of the two values. For this reason, it is necessary that the drive capability is almost the same between the NAND gate 11 and the NAND gate 12 in order to generate random numbers.

Furthermore, input signal A needs to be input to the NAND gate 11 and the NAND gate 12 at the same time. When the input timing of input signal A is different, the output value is biased. In other words, the skew of time at which input signal A arrives the NAND gate 11 and the NAND gate 12 should be extremely small.

As described above, there are some cases in which the random number generator 20 fails to generate random numbers due to an individual difference among the RS latches 10. However, it is not easy to obtain the RS latches 10 that satisfy the aforementioned requirements. For example, when sixty-four RS latches 10 implemented in an FPGA (Field Programmable Gate Array) are used to configure the random number generator 20, as a matter of fact, only four of them (probability of 1/16) succeeded in generating random numbers.

Next, FIG. 3 will be explained. FIG. 3 illustrates the second example of the circuit of a random number generator in which the RS latch 10 is used.

The random number generator 30 of FIG. 3 is provided with n (n indicates an integer equal to or larger than "2") RS latches 10-1, ..., and 10-n, and an XOR (exclusive-OR) gate 31.

In the RS latches 10-1, ..., and 10-n, the same clock signal is input to the respective set input "#S" and reset input "#R". Outputs Q of the RS latches 10-1, ..., and 10-n are input to an XOR gate 31, and the XOR gate 31 outputs the exclusive-OR as a result of random number generation in the random number generator 30.

As described above, in the random number generator 30, n RS latches 10-1, ..., and 10-n are used to configure n random number generators 20 of FIG. 2A. And then, an exclusive-OR of these outputs are calculated and aggregated to 1 bit, and this exclusive-OR is used as a result of random number generation in the random number generator 30. By so doing, even if there are some random number generators 20 that fail to generate random numbers for the reasons as described above, it becomes possible to obtain random numbers with high randomness.

A technique in which a number of latches are implemented as in the random number generator 30 of FIG. 3 and random numbers are generated by making use of metastables of the latches is widely used because it becomes possible to obtain random numbers with high randomness with a small circuit size.

As well, when the random number generator 30 is implemented on an IC chip, the RS latches 10-1, ..., and 10-n may be arranged on the IC chip in a dispersed manner. When the RS latches 10-1, ..., and 10-n are arranged on an IC chip in a condensed manner, the RS latches 10-1, ..., and 10-n are equally influenced by the noise caused by other circuits arranged in the periphery of the arranged positions. On the other hand, when the RS latches are arranged in a dispersed manner as described above, the RS latches 10-1, ..., and 10-n are differently influenced by the noise caused by various circuits on the IC chip. Accordingly, an improvement in the intrinsic property (high randomness) of the obtained random numbers can be expected. The RS latches 10-1, ..., and 10-n are arranged on an IC chip in a dispersed manner for the above reasons.

As another related art, a technique of random number generation is known in which a digital output value which is not uniquely defined by a digital input value is obtained and an occurrence frequency of "0" and "1" in the digital output value is equalized.

Note that the techniques disclosed in the following document are also known.

Document 1: Japanese Patent No. 3604674

In the meanwhile, as described above, it is desirable that secret keys be generated by using true random numbers for high security. However, there are some problems in providing a handheld device like the aforementioned smart card with an intrinsic random number generator dedicated to generate random numbers. In other words, usable hardware resource is limited in such a handheld device. Moreover, a random number generator with low power consumption is desirable because power supply voltage is low in such a handheld device. Furthermore, IC chips installed in such a handheld device are small in size. For this reason, it is desirable that the amount of noise caused by a random number generator be small so as not to affect the other circuits arranged on the IC chip. In other words, a random number generator that produces random numbers of high quality (i.e., random numbers that cannot be predicted easily) with low noise and low power consumption is demanded for a handheld device such as a smart card.

When the random number generator 30 of which the configuration is illustrated in FIG. 3 is implemented on the IC chip of the RS latches 10-1, . . . , and 10-n in a dispersed manner as described above, the noise caused by the RS latches 10-1, . . . , and 10-n in a state of metastable influences the other circuits, which is a problem.

The noise caused by a metastable is significantly smaller than the noise caused by an oscillator circuit. Moreover, as described above, only a part of the RS latches 10-1, . . . , and 10-n produces random numbers in a state of metastable as a matter of fact. Under such circumstances, the effect of the noise caused by the RS latches 10-1, . . . , and 10-n when the RS latches 10-1, . . . , and 10-n are arranged on an IC chip in a dispersed manner was not considered to be a great concern.

Here, FIG. 4 will be explained. FIG. 4 depicts an example of the observation of the input/output waveform of the random number generator 30 of FIG. 3.

In FIG. 4, the waveform on the top is the observed waveform of a clock signal input to the random number generator 30, and the waveform on the bottom is the observed waveform of an output of the random number generator 30 (i.e., the generated random numbers).

When attention is given to the observed waveform on the bottom of FIG. 4, it is found that the output of the random number generator 30 is in an abnormal condition like oscillation, and that the timing at which the observed waveform on the bottom moves up and down is almost the same as that of the observed waveform on the top. In other words, it is estimated from this observed waveform that the noise caused by the abnormal condition like oscillation affects the clock signal of the input. When a lot of noise is included in the clock signal input to the random number generator 30, other circuits may malfunction as the noise reaches these circuits via, for example, the transmission line of the clock signal.

Factors responsible for an abnormal condition like oscillation of the output of the random number generator 30 will be explained with reference to FIG. 5A, FIG. 5B, and FIG. 5C.

FIG. 5A illustrates an example of the input/output waveform of the random number generator 20 of FIG. 2A that actually produces random numbers.

In FIG. 5A, the waveform on the top represents the signal waveform of an input A of a clock signal. The waveform in the middle and the waveform on the bottom are both the signal waveform of an output B. Note that duration time Td of a state of metastable of the RS latch 10 in use is different between the random number generator 20 that outputs the waveform in the middle and the random number generator 20 that outputs the waveform on the bottom.

As described above, in regard to n random number generators 20 that constitute the random number generator 30 of FIG. 3, duration time Td of a state of metastable is different among the random number generators 20 that actually produce random numbers.

Next, FIG. 5B will be explained. FIG. 5B also illustrates an example of the input/output waveform of the random number generator 20 of FIG. 2A, but in this case, the random number generator 20 does not actually produce random numbers. This example relates to the random number generator 20 in which the RS latch 10 in use falls into a state of metastable when the input A is changed from "0" to "1", but the output B always becomes "0" subsequent to that in this example.

In FIG. 5B, the waveform on the top represents the signal waveform of an input A of a clock signal. The waveform in the middle and the waveform on the bottom are both the signal waveform of an output B. Note that in a similar manner to the example of the waveform in FIG. 5B, duration time Td of a state of metastable of the RS latch 10 in use is different between the random number generator 20 that outputs the waveform in the middle and the random number generator 20 that outputs the waveform on the bottom.

As described above, in regard to n random number generators 20 that constitute the random number generator 30 of FIG. 3, duration time Td of a state of metastable is also different among the random number generators 20 that actually do not produce random numbers.

Next, FIG. 5C will be explained. FIG. 5C is an example of the signal waveform of each element of the random number generator 30 of FIG. 3. In this example of waveform, the random number generator 30 is provided with four RS latches 10-1 to 10-4.

In FIG. 5C, the first waveform from the top represents the signal waveform of an input A of a clock signal. The second to fifth waveforms represent the signal waveforms of an output B to the RS latches 10-1, 10-2, 10-3, and 10-4, respectively, where the duration time Td of a state of metastable is different from each other. The sixth waveform which is the bottom depicts the waveform of an output signal of the XOR gate 31, where the random number generated by the random number generator 30 is represented.

As described above, it is understood that an output signal of the XOR gate 31 falls into an abnormal condition like oscillation when the duration time Td of a state of metastable is different from each other among the RS latches 10-1, 10-2, 10-3, and 10-4.

As described above, in the random number generator 30 of FIG. 3, regardless of whether random numbers are generated or not, a difference in duration time Td of a state of metastable among the RS latches 10-1, . . . , and 10-n causes the aforementioned abnormal condition, and as a result, noise is caused. The state of metastable of the RS latches 10-1, . . . , and 10-n can be a source of noise as a matter of course. For this reason, when the RS latches 10-1, . . . , and 10-n that operates as described above are arranged on an IC chip in a dispersed manner, a malfunction of other circuits may be induced.

As described above, in the random number generator 30 of FIG. 3, even the RS latches 10-1, . . . , and 10-n that actually do not generate any random numbers falls into a state of metastable. However, the power consumption for such RS latches does not at all contribute to the generation of random numbers, which is a waste. Such a waste of power consumption poses a serious problem for the aforementioned handheld device such as a smart card.

SUMMARY

According to an aspect of the embodiment, a random number generator includes: an exclusive-OR circuit configured to obtain an exclusive-OR of outputs from a plurality of digital circuits; a random number determiner configured to determine whether or not an output generated according to an instruction to generate random numbers is a random number for each of the plurality of digital circuits; and a random number generation instruction inhibitor configured to inhibit an instruction to generate random numbers to be provided to the plurality of digital circuits whose output generated according to the instruction is determined to be not a random number by the random number determiner.

According to another aspect of the embodiment, an encryption device includes: a random number generator configured to include: an exclusive-OR circuit configured to obtain an exclusive-OR of outputs from a plurality of digital circuits; a random number determiner configured to determine whether or not an output generated according to an instruction to generate random numbers is a random number for each of the plurality of digital circuits; and a random number generation instruction inhibitor configured to inhibit an instruction to generate random numbers to be provided to the plurality of digital circuits whose output generated according to the instruction is determined to be not a random number by the random number determiner; and an encryption processor configured to encrypt information by using a sequence of random numbers generated by the random number generator as a cryptographic key.

According to further another aspect of the embodiment, an authentication device includes: a random number generator configured to include: an exclusive-OR circuit configured to obtain an exclusive-OR of outputs from a plurality of digital circuits; a random number determiner configured to determine whether or not an output generated according to an instruction to generate random numbers is a random number for each of the plurality of digital circuits; and a random number generation instruction inhibitor configured to inhibit an instruction to generate random numbers to be provided to the plurality of digital circuits whose output generated according to the instruction is determined to be not a random number by the random number determiner; a communicator configured to transfer and receive various types of information by communicating with a device to be authenticated; a decryption processor configured to perform a decryption process on encrypted information by using a specified cryptographic key shared with a genuine device to be authenticated in common; and an authentication processor configured to perform an authentication process on the device to be authenticated according to information obtained by a decryption process of the decryption processor, wherein the communicator receives encrypted information transmitted from the device to be authenticated by which a sequence of random numbers generated by the random number generator is received when the sequence of random numbers is transmitted to the device to be authenticated, the encrypted information being obtained by performing an encryption process on the sequence of random numbers by the device to be authenticated, the decryption processor performs the decryption process on the encrypted information received by the communicator, and the authentication processor determines in the authentication process as to whether or not decryption information obtained by the decryption processor performing the decryption process on the encrypted information received by the communicator matches a sequence of random numbers transmitted to the device to be authenticated, and when it is determined that the decryption information matches the sequence of random numbers, obtains an authentication result indicating that the device to be authenticated is genuine.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1B is a truth table of the RS latch of FIG. 1A.

FIG. 7 is an example of the observation of the input/output waveform of the random number generator of FIG. 6.

DESCRIPTION OF EMBODIMENTS

Preferred embodiments of the present invention will be explained with reference to accompanying drawings.

Figure 6:
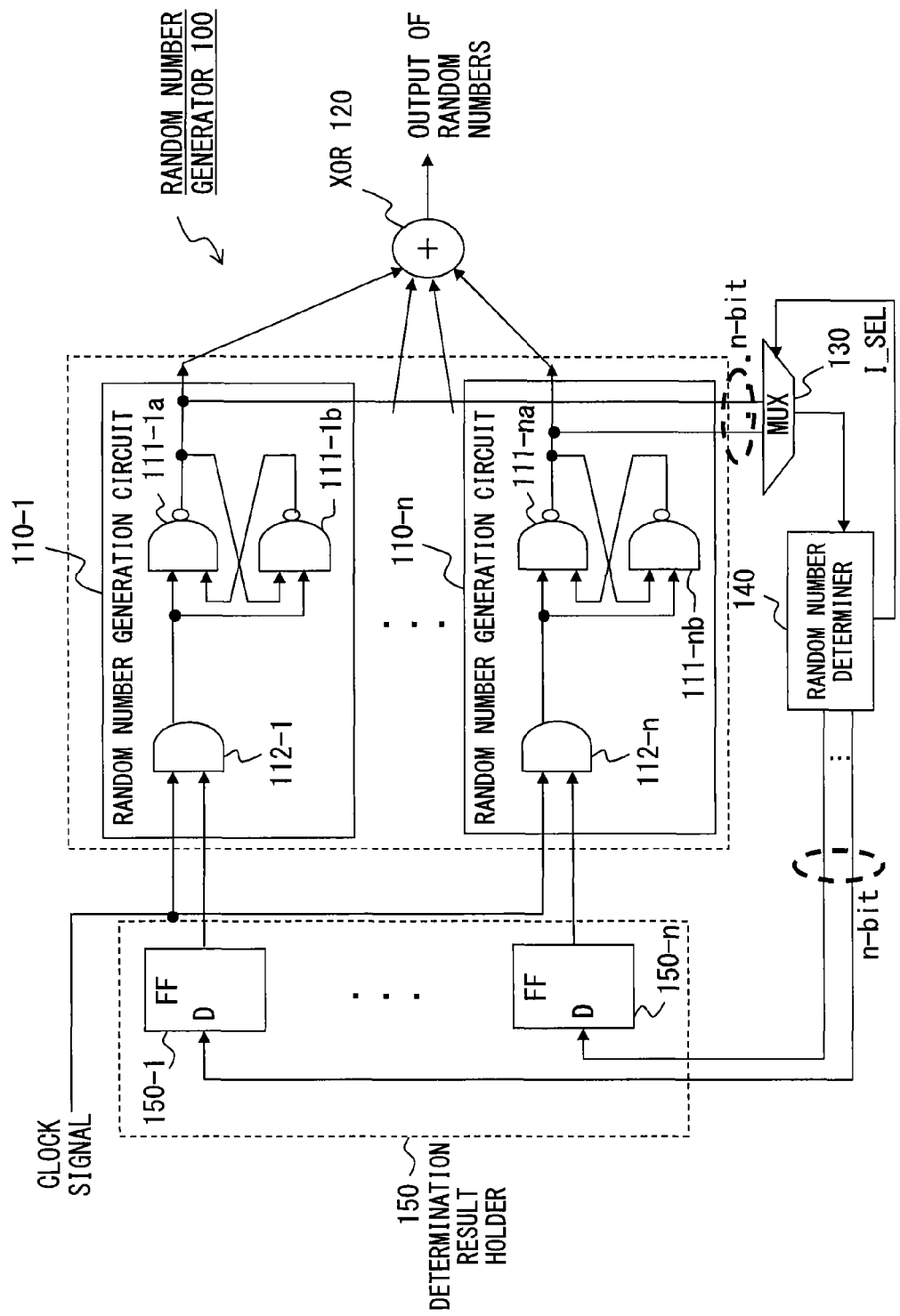
FIG. 6 illustrates an example of the circuitry of a random number generator according to the present embodiment.

Firstly, FIG. 6 will be explained. FIG. 6 illustrates an example of the circuitry of a random number generator according to the present embodiment.

The random number generator 100 is provided with n (n indicates an integer equal to or larger than "2") random number generation circuits 110-1, ..., and 110-n, an XOR gate 120, a multiplexer 130, a random number determiner 140, and a determination result holder 150.

The random number generation circuits 110-1, ..., and 110-n are digital circuits each of which is provided with NAND gates 111-1a and 111-1b, ..., and 111-na and 111-nb each of which has two inputs and AND (logical product) gates 112-1, ..., and 112-n each of which has two inputs. Note that the random number generation circuits 110-1, ..., and 110-n have the same configuration. For this reason, here, only the configuration of the random number generation circuit 110-1 will be explained.

In the random number generation circuit 110-1, the output of the AND gate 112-1 and the output of the NAND gate 111-1b are connected to the two inputs of the NAND gate 111-1a, respectively. Moreover, the output of the AND gate 112-1 and the output of the NAND gate 111-1a are connected to the two inputs of the NAND gate 111-1b, respectively.

In other words, an RS latch circuit is configured by the NAND gate 111-1a and the NAND gate 111-1b, and it is configured such that an output signal of the AND gate 112-1 is input to both a set input and a reset input of the RS latch circuit. In fact, the output of the NAND gate 111-1a is the output of the random number generation circuit 110-1.

Figure 1A:
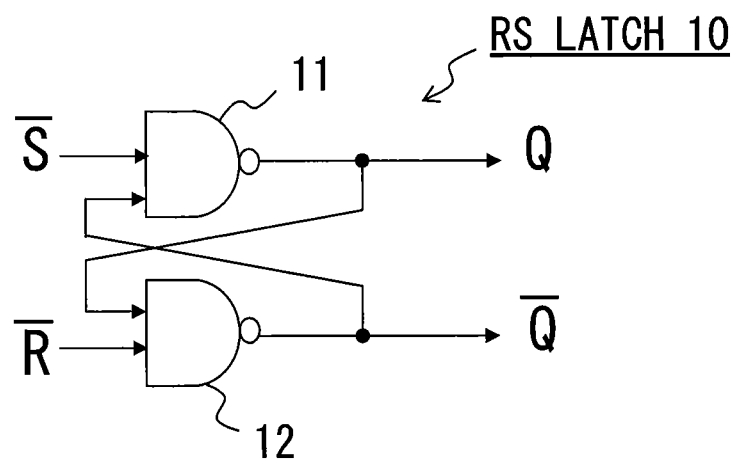
FIG. 1A illustrates an example of the circuitry of an RS latch.
Figure 2A:
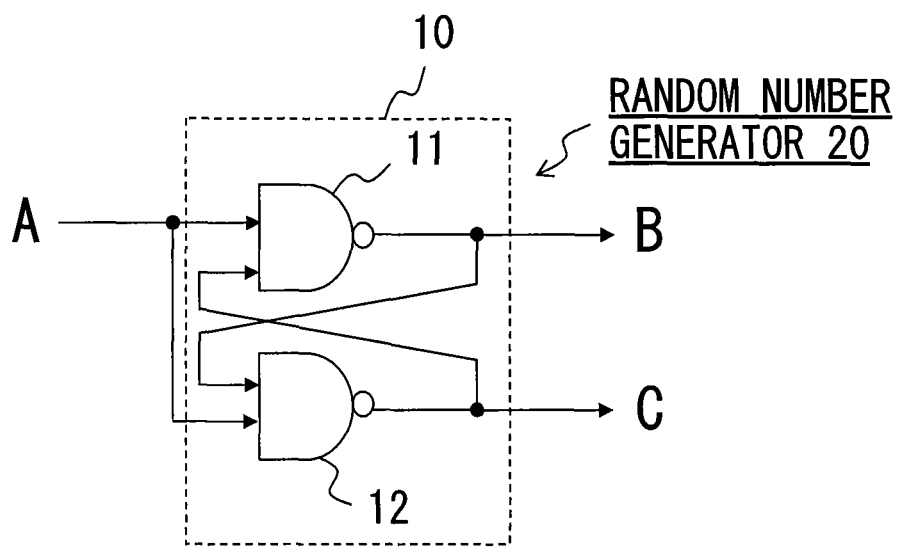
FIG. 2A is the first example of the circuitry of a conventional random number generator in which the RS latch of FIG. 1A is used.

The random number generation circuit 110-1 is configured as described above. In other words, the random number generation circuit 110-1 has the same circuitry as the random number generator 20 of FIG. 2A.

The AND gate 112-1 gates inputs of clock signals to the aforementioned set input and reset input of the RS latch circuit in the random number generation circuit 110-1. The operations of the AND gate 112-1 will be explained in further detail.

Figure 2B:
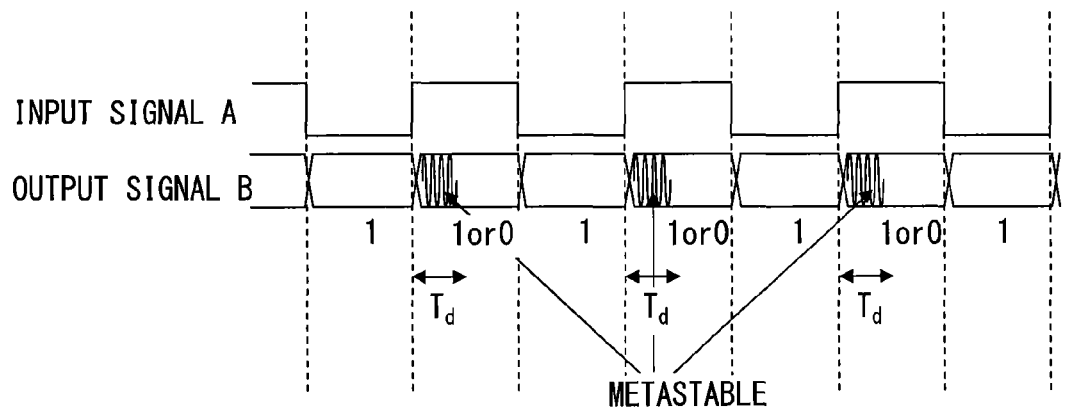
FIG. 2B is an example of the input/output waveform of the random number generator of FIG. 2A.

An clock signal output from another circuit (for example, an alternate signal of "0" and "1" like input signal A of FIG. 2B) is input to one of the inputs of the AND gate 112-1, and one of n outputs of the determination result holder 150, which will be described later, is input to the other input of the AND gate 112-1. The AND gate 112-1 calculates the logical product of the two inputs, and outputs the calculated logical product. Accordingly, the AND gate 112-1 outputs a clock signal output from another circuit to both the set input and reset input of the aforementioned RS latch circuit while the input from the determination result holder 150 is "1". In other words, the AND gate 112-1 inputs a clock signal output from another circuit to the aforementioned RS latch circuit while the input from the determination result holding unit 150 is "1".

On the other hand, while the input from the determination result holder 150 is "0", the AND gate 112-1 outputs "0" to both the set input and reset input of the aforementioned RS latch circuit regardless of the logic of a clock signal. This is how, while the input from the determination result holder 150 is "0", the AND gate 112-1 inhibits an instruction to generate random numbers to be provided to the random number generation circuit 110-1 by inputting "0" to the aforementioned RS latch circuit.

The XOR gate 120 is an exclusive-OR circuit that calculates and outputs an exclusive-OR of the output of the random number generation circuits 110-1, . . . , and 110-$n$ each of which is configured as above.

The multiplexer 130 is a selector that selects one of the output signals from the random number generation circuits 110-1, . . . , and 110-$n$ on a one-by-one basis according to a selection instruction of a selection instruction signal I_SEL transmitted from the random number determination circuit 140, and that outputs the selected output signal. The output signal selected by the multiplexer 130 is sent to the random number determiner 140.

The random number determiner 140 controls the determination result holder 150 to provide an instruction to generate random numbers to each of the random number generation circuits 110-1, . . . , and 110-$n$. More specifically, the random number determiner 140 inputs as the instruction to generate random numbers an input by which the RS latch circuit falls into a metastable state and which makes an output be in an unstable state (random number) (such an input will be referred to as "unstable state input") to each of the aforementioned RS latch circuits of the random number generation circuits 110-1, . . . , and 110-$n$. Then, the random number determiner 140 determines whether or not an output of the random number generation circuits 110-1, . . . , and 110-$n$ to which an instruction to generate random numbers is provided is a random number, i.e., whether or not an output of the RS latch circuit to which the aforementioned unstable state input is input is a random number, and outputs the determination result to the determination result holder 150.

The determination result holder 150 is provided with n D-flip-flops (hereinafter, referred to as "D-FF") 150-1, . . . , and 150-$n$ which correspond to the random number generation circuits 110-1, . . . , and 110-$n$ on a one-to-one basis. N outputs from the random number determiner 140 are input to the inputs of the D-FFs 150-1, . . . , and 150-$n$ on one-to-one basis, and the D-FFs 150-1, . . . , and 150-$n$ holds the output, i.e., the determination result by the random number determiner 140. The outputs of the D-FF 150-1, . . . , and 150-$n$ are input to the AND gates 112-1, . . . , and 112-$n$ of the random number generation circuits 110-1, . . . , and 110-$n$, respectively, as the outputs of the determination result holder 150.

The determination result holder 150 may be configured by replacing the D-FFs 150-1, . . . , and 150-$n$ with n D-latches. Generally, a D-latch has smaller circuit size than a D-flip-flop. For this reason, when the determination result holder 150 is configured with D-latches, the circuit size of the random number generator 100 becomes small.

The operations of the random number generator 100 of FIG. 6, which is configured as above, will be described.

Firstly, once supply of electric power to the random number generator 100 starts, the D-FFs 150-1, . . . , and 150-$n$ of the determination result holding unit 150 are reset, and "0" is stored as an initial value. In this case, all the outputs of the AND gates 112-1, . . . , and 11-$n$ become "0", and the outputs of the random number generation circuits 110-1, . . . , and 110-$n$ become "1". After that, as long as the stored values of the D-FFs 150-1, . . . , and 150-$n$ are "0", the outputs of the random number generation circuits 110-1, . . . , and 110-$n$ are invariantly held (value "1").

Once initialization processes at the time supply of electric power starts as described above are completed, next, the random number determiner 140 checks each of the random number generation circuits 110-1, . . . , and 110-$n$ to determine whether or not an output generated according to the instruction to generate random numbers is a random number. Then, the random number determiner 140 makes the determination result holder 150 store the determination result. Note that the operations performed by the random number determiner 140 for this purpose are the same as those of the random number generation circuits 110-1, . . . , and 110-$n$. Hence, only the operations performed by the random number determiner 140 on the random number generation circuit 110-1 will be described in detail.

Firstly, the random number determiner 140 controls the multiplexer 130 to select an output of the random number generation circuit 110-1, and controls the D-FF 150-1 to store "1". Then, the AND gate 112-1 starts outputting clock signals output from another circuit, and these clock signal are input to the set input and reset input of the RS latch circuit included in the random number generation circuit 110-1.

Here, when a clock signal input from the AND gate 112-1 is changed from "0" to "1", the output of the AND gate 112-1 is also changed from "0" to "1", and the AND gate 112-1 starts inputting the unstable state inputs to the RS latch circuit of the random number generation circuit 110-1. In other words, the AND gate 112-1 is giving an instruction to generate random numbers to the random number generation circuit 110-1 at this time, and the RS latch circuit of the random number generation circuit 110-1 falls into a state of metastable where the output value is in an unstable state.

Subsequent to the continuation for certain period of time Td after the rising edge of a clock signal input from the AND gate 112-1, the output of the random number generation circuit 110-1 (i.e., output of the RS latch circuit) converges into "0" or "1". This output is input to the random number determiner 140 through the multiplexer 130.

After the RS latch circuit has gone through the metastable state, the random number determiner 140 observes the output of the RS latch circuit while the unstable state input is being input to the RS latch circuit of the random number generation circuit 110-1. Note that this observation is repeated for a specified number of times corresponding to the clock signal input from the AND gate 112-1.

At the same time, the random number determiner 140 checks the output repeatedly observed for the specified number of times corresponding to the clock signal to determine whether the logic of an output has not been changed for a specified number of times on a continuous basis. When the observation result includes the situation in which the logic of an output did not change for the specified number of times on a continuous basis, the random number determiner 140 determines that the output from the RS latch circuit of the random number generation circuit 110-1 is not random numbers (i.e., the RS latch circuit does not generate any random numbers). On the other hand, when the logic of an output changed for the specified number of times on a continuous basis in the observation result, the random number determiner 140 determines that the output from the RS latch circuit of the random number generation circuit 110-1 is random numbers (i.e., the RS latch circuit generates random numbers).

Next, when it is determined that output from the RS latch circuit of the random number generation circuit 110-1 is not random numbers, the random number determiner 140 stores "0" in the D-FF 150-1 of the determination result holder 150. When the determination result stored in the D-FF 150-1 is received at the AND gate 112-1, the AND gate 112-1 outputs the determination result just as it is. In other words, when the value stored in the D-FF 150-1 is "0", the AND gate 112-1 gives this value to the random number generation circuit 110-1 just as it is. Accordingly, the output of the random number generation circuit 110-1 in this case becomes "1". After that, as long as the stored value of the D-FFs 150-1 is "0", the state in which the input value from the AND gate 112-1 to the random number generation circuit 110-1 is "0" is maintained, and thus the output of the random number generation circuit 110-1 is invariantly held (value "1"). In other words, when "0" is stored in the D-FF 150-1 of the determination result holder 150, the AND gate 112-1 inhibits an instruction to generate random numbers for the random number generation circuit 110-1.

On the other hand, when the random number determiner 140 determines that output from the RS latch circuit of the random number generation circuit 110-1 is random numbers, value "1" stored in the D-FF 150-1 is maintained just as it is. Accordingly, the RS latch circuit of the random number generation circuit 110-1 continues producing random numbers in this case.

The random number determiner 140 controls the multiplexer 130 and the determination result holder 150 as described above to determine whether or not the output generated by the RS latch circuit of the random number generation circuit 110-1 is random numbers according to an instruction to generate random numbers, and the random number determiner 140 holds its determination result. While controlling the multiplexer 130 to switch the selection of the outputs of the random number generation circuits 110-1, . . . , and 110-n in turn, the random number determiner 140 performs the aforementioned operations on each of the random number generation circuits 110-1, . . . , and 110-n in sequence.

Then, after the aforementioned operations on the random number generation circuits 110-1, . . . , and 110-n are completed, the random number determiner 140 terminates the operation of itself and the operation of the multiplexer 130, thereby cutting back further power consumption. After that, only the random number generation circuits 110-1, . . . , and 110-n in which the outputs generated according to an instruction to generate random numbers are determined to be random numbers by the random number determiner 140 generate random numbers, and the outputs are input to the XOR 120. On the other hand, the random number generation circuits 110-1, . . . , and 110-n in which the outputs generated according to an instruction to generate random numbers are determined to be not random numbers by the random number determiner 140 are inhibited from generating an unstable state input where the RS latch circuit is in a metastable state, and such random number generation circuits always output value "1". As a result, noise caused due to a metastable state of the RS latch circuit is suppressed in the random number generation circuits 110-1, . . . , and 110-n in which the outputs generated according to an instruction to generate random numbers are determined to be not random numbers by the random number determiner 140, and the power consumption is also suppressed.

Here, FIG. 7 will be explained. FIG. 7 is an example of the observation of the input/output waveform of the random number generator 100 of FIG. 6.

In FIG. 7, the waveform on the top indicates the observed waveform of a clock signal input to the random number generator 100, and the waveform on the bottom indicates the observed waveform of an output from the random number generator 100 (i.e., the generated random number).

Figure 3:
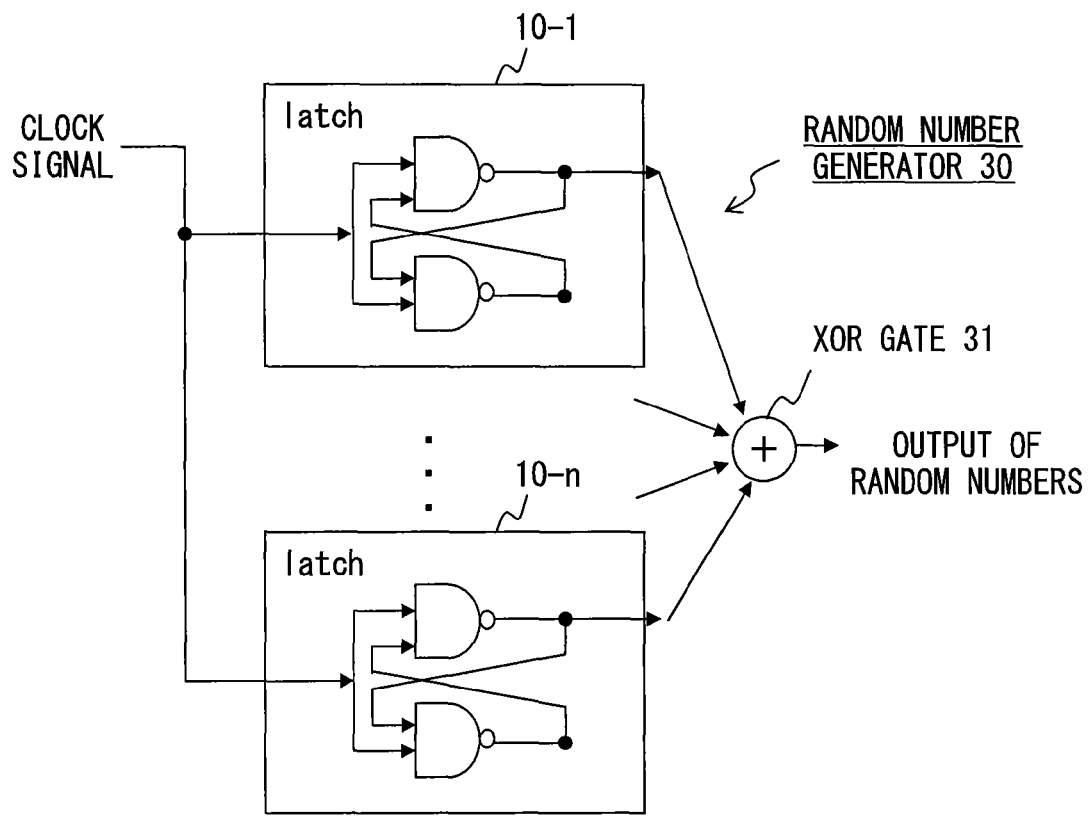
FIG. 3 illustrates the second example of the circuitry of a conventional random number generator in which the RS latch of FIG. 1A is used.
Figure 4:
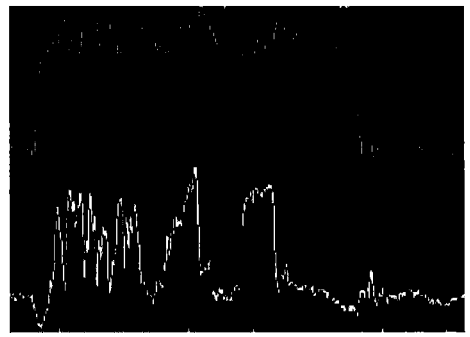
FIG. 4 depicts an example of the observation of the input/output waveform of the random number generator of FIG. 3.
Figure 5A:
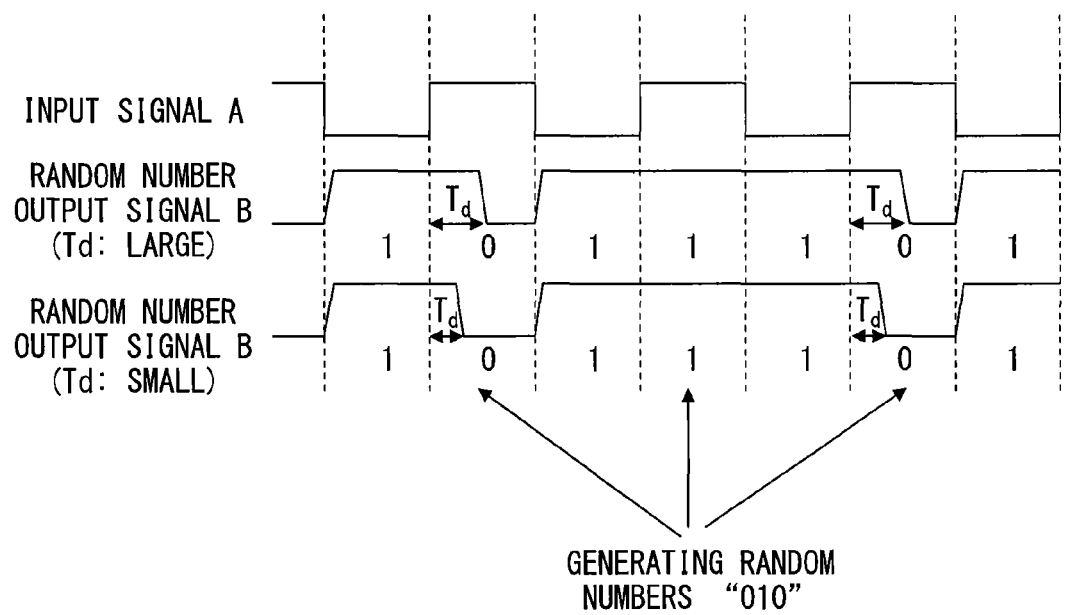
FIG. 5A is an explanatory schematic diagram (1) of the reason why an output of the random number generator of FIG. 3 falls into an abnormal condition.
Figure 5B:
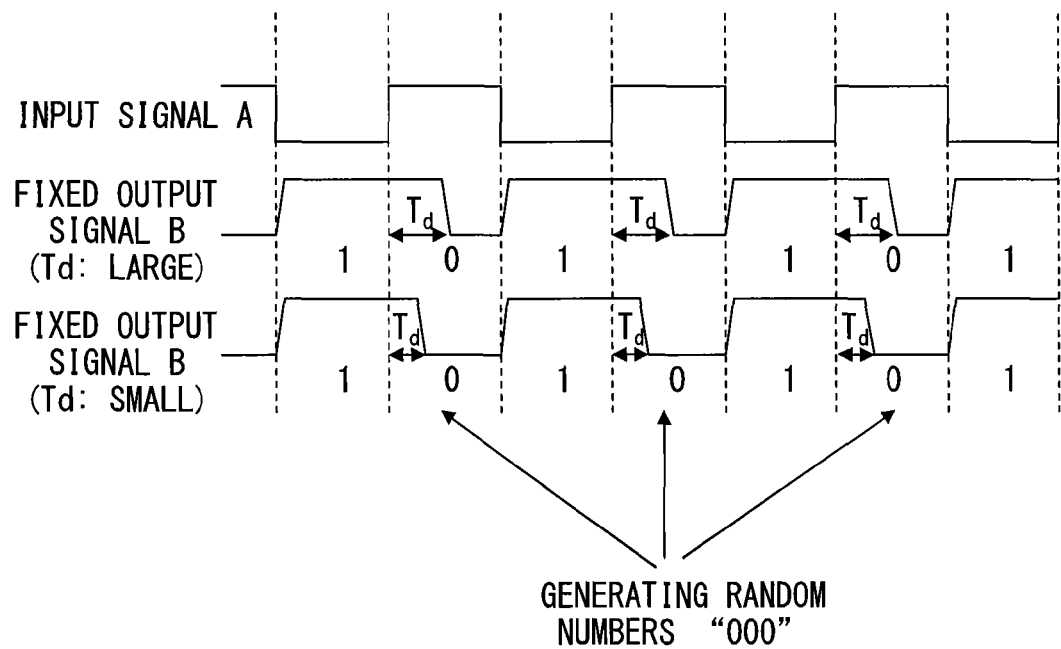
FIG. 5B is an explanatory schematic diagram (2) of the reason why an output of the random number generator of FIG. 3 falls into an abnormal condition.
Figure 5C:
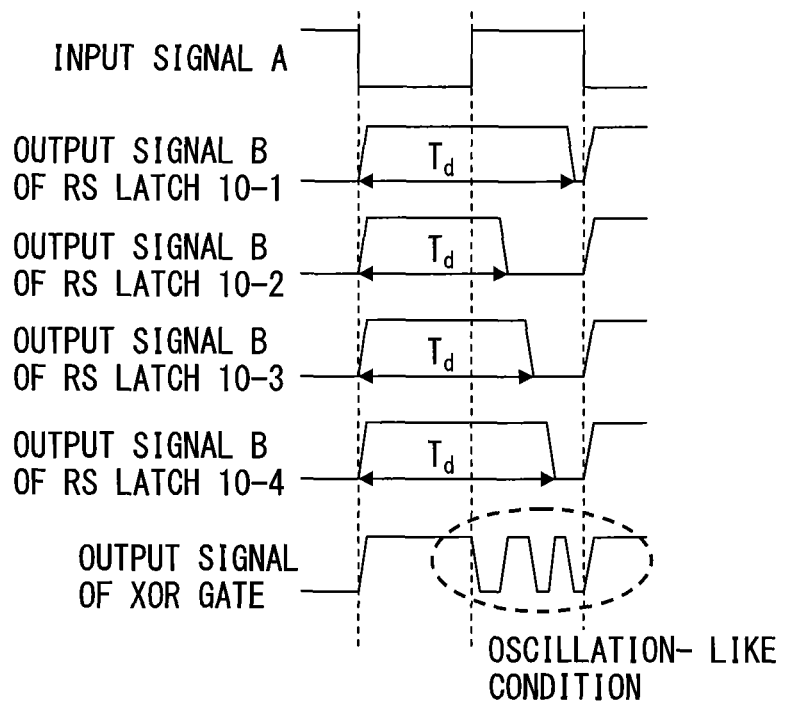
FIG. 5C is an explanatory schematic diagram (3) of the reason why an output of the random number generator of FIG. 3 falls into an abnormal condition.

Comparing the waveform of FIG. 7 with the waveform of FIG. 4, it is found that an abnormal condition like oscillation is significantly reduced in the random number generator 100 of FIG. 6 in comparison to the random number generator 30 of FIG. 3. Moreover, it is found that noise affecting a clock signal is significantly reduced, accordingly.

Here, the reduction effectiveness in noise and power consumption by the random number generator 100 of FIG. 6 is quantitatively estimated.

In a certain FPGA, one in sixteen of the entirety of the implemented RS latch circuits succeeded in generating random numbers. In other words, in the random number generator 100 of FIG. 6, fifteen in sixteen of the implemented RS latch circuits are inhibited from generating random numbers. Accordingly, when calculation is made in a simplified manner, it is expected that the amount of noise production in the random number generator 100 of FIG. 6 will be reduced to one in sixteen in comparison to the conventional art (for example, the random number generator 30 of FIG. 3).

Next, the issue of power consumption will be reviewed. It is assumed that the power consumption of the RS latch circuit is "$\alpha$", and the power consumption of a D-flip-flop circuit is "$2\alpha$" which is twice that of the RS latch. When it is assumed one hundred twenty-eight RS latches are implemented, the power consumption in the conventional art (for example, the random number generator 30 of FIG. 3) is "$128\alpha$" where the power consumption of the one hundred twenty-eight RS latch circuits is taken into consideration. By contrast, the power consumption of the random number generator 100 of FIG. 6 is "$8\alpha+8\times2\alpha=24\alpha$" where the power consumption of the eight RS latch circuits that generate random numbers as well as the eight D-flip-flop circuits connected to the inputs of the eight RS latch circuits is taken into consideration. Accordingly, it is calculated that $24\alpha/128\alpha=3/16$ and thereby expected that the power consumption of the random number generator 100 of FIG. 6 is reduced to about three in sixteen in comparison to the conventional art.

Moreover, the random number generator 100 of FIG. 6 is configured such that value "0" will be stored in the D-FFs 150-1, . . . , and 150-n of the determination result holder 150 when an instruction to generate random numbers for the random number generation circuits 110-1, . . . , and 110-n is inhibited. The D-FFs 150-1, . . . , and 150-n output the value "0" to the AND gates 112-1, . . . , and 112-n of the random number generation circuits 110-1, . . . , and 110-n. When the input value from the D-FFs 150-1, . . . , and 150-n is "0" in this case, the AND gates 112-1, . . . , and 112-n output value "0" to the RS latch circuits of the random number generation circuits 110-1, . . . , and 110-n.

In the D-FFs 150-1, . . . , and 150-n, less power consumption is required in outputting potential at a low level (i.e., value "0") out of binary logic levels having different potentials in comparison to outputting potential at a high level (i.e., value "1"). In a similar manner, also in the AND gates 112-1, . . . , and 112-n, less power consumption is required in outputting potential at a low level out of binary logic levels having different potentials in comparison to outputting potential at a high level. It has previously been explained that even if RS latch circuits generate random numbers by making use of a metastable state, as a matter of fact, the number of the RS latch circuits that do not generate random numbers is significantly larger than the number of the RS latch circuits that generate random numbers. Accordingly, the power consumption by the random number generator 100 of FIG. 6 is reduced by assigning value "0" instead of value "1" to the outputs of the D-FFs 150-1, . . . , and 150-n in response to an instruction to generate random numbers, and by also assigning value "0" instead of value "1" to the outputs of the AND gates 112-1, . . . , and 112-n in response to an instruction to generate random numbers.

Next, the use of the random number generator 100 of FIG. 6 will be explained.

An encryption function is a typical function that requires the generation of random numbers, and the random number generator 100 may be used for an electronic device that uses the encryption function. The aforementioned smart card is a specific example of the electronic device that uses the encryption function, and the random number generator 100 may be used in a smart card. Moreover, such an encryption function is required for terminal equipment of mobile phone devices or wireless Internet access, or the like in order to ensure the concealment of the radio communication, and the random number generator 100 may be used for such electronic devices. Furthermore, in recent years, imitation products of electronic devices such as an ink cartridge for document printers, a battery dedicated to a certain battery-driven electronic device, and a program cartridge in which the program of a game console is installed are on the market. In order to prevent the extensive distribution of such imitation products, an authentication function for genuine products may be used. The generation of random numbers may be used to realize such an authentication function, and the random number generator 100 may be used for an electronic device that uses such an authentication function.

Figure 8:
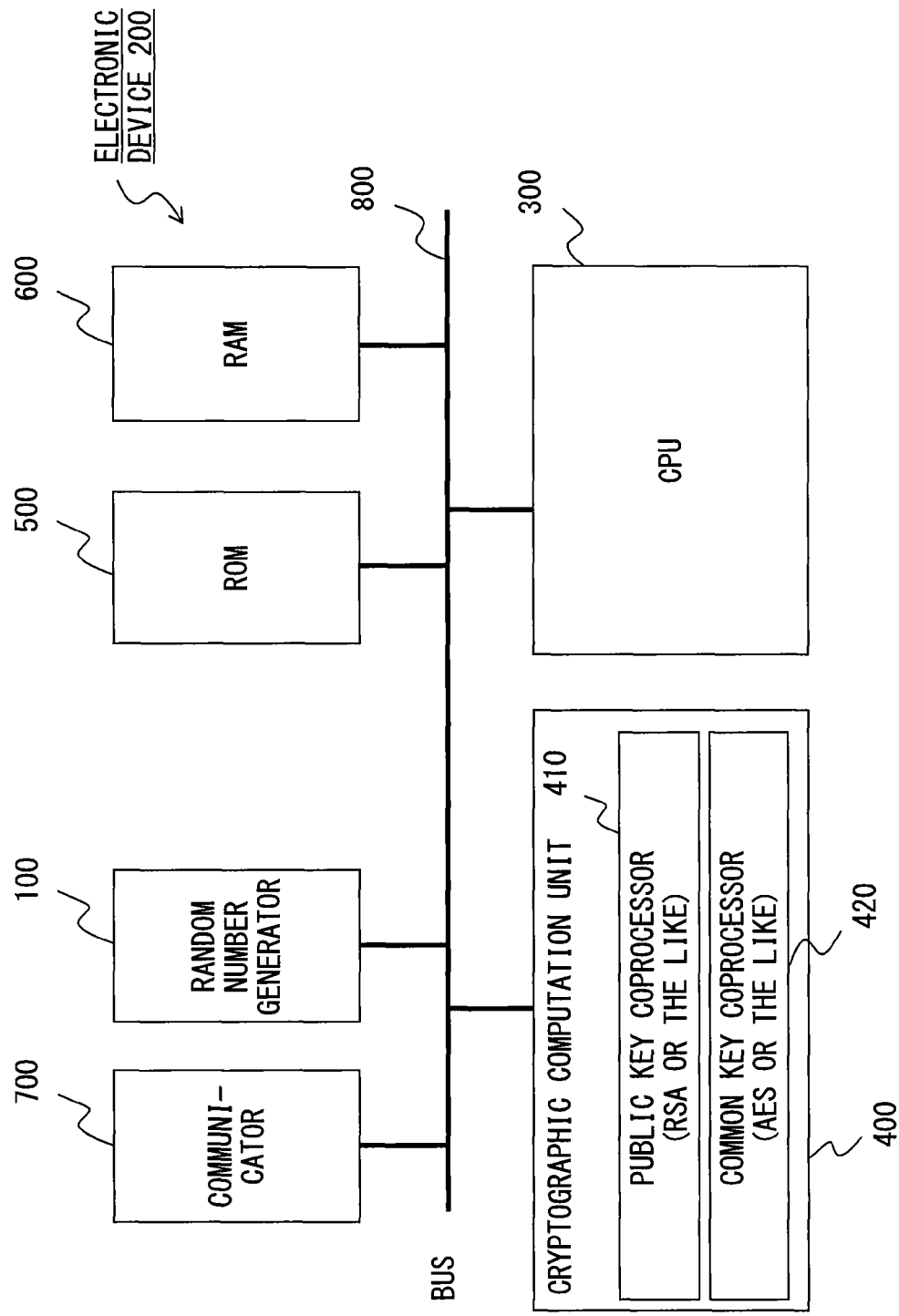
FIG. 8 illustrates an example of the configuration of an electronic device provided with the random number generator of FIG. 6.

Here, FIG. 8 will be explained. FIG. 8 illustrates an example of the configuration of the electronic device 200 provided with the random number generator 100 of FIG. 6. The electronic device 200 may operate as an encryption device, and may also operate as an authentication device.

The electronic device 200 is provided with the random number generator 100 illustrated in FIG. 6, a CPU 300, a cryptographic computation unit 400, a ROM 500, a RAM 600, and a communicator 700. Note that all of these elements are connected to a bus line 800, and are configured to mutually send and receive various types of data under the control of the CPU 300.

The CPU (Central Processing Unit) 300 is a central processor that controls the operations of the elements of the electronic device 200.

The cryptographic computation unit 400 encrypts various types of information, and decrypts the encrypted data. In the present embodiment, the cryptographic computation unit 400 is provided with a public key coprocessor 410 and a common key coprocessor 420. The public key coprocessor 410 performs encryption and decryption processes by using typical public key cryptography such as, for example, the RSA cryptography or elliptic curve cryptography. The common key coprocessor 420 performs encryption and decryption processes by using typical common key cryptography such as, for example, the AES cryptography. Instead of providing the electronic device 200 for the cryptographic computation unit 400, the CPU 300 may be configured to perform the encryption and decryption processes that are performed by the cryptographic computation unit 400.

The ROM (Read Only Memory) 500 is a nonvolatile semiconductor memory in which control programs executed by the CPU 300 and unique parameters used by the cryptographic computation unit 400 for encryption and decryption processes are stored in advance. The CPU 300 starts reading the control programs from the ROM 500 and executing the read control programs when power supply to the electronic device 200 starts, thereby controls the operations of the elements of the electronic device 200.

The RAM (Random Access Memory) 600 is a volatile semiconductor memory which is used as working storage as necessary when the CPU 300 and the cryptographic computation unit 400 perform several types of processing.

The communicator 700 transmits and receives various types of data, thereby exchanging various types of data with other electronic devices 200 which have the same configuration.

When the electronic device 200 is used as an encryption device, the random number generator 100 is used to generate a cryptographic key when the cryptographic computation unit 400 encrypts the information. Note that the cryptographic key used for the encryption process is stored and held, for example, in the RAM 600, and the held cryptographic key is used by the cryptographic computation unit 400 later to decrypt the encrypted information.

When the random number sequence generated by the random number generator 100 is used for the generation of a cryptographic key, post processing may be performed on the generated random number sequence in order to further improve the randomness of the random numbers in the generated random number sequence. Such post processing used for this purpose includes, for example, the use of a linear feedback shift register (LFSR). The LFSR is a counter which is configured by a shift register that performs feedback by using an exclusive-OR circuit, and it is known that when a random number sequence is input to the LFSR, the random number sequence is compressed and the random number sequence whose randomness as random numbers is improved is obtained. For this reason, when a cryptographic key is generated by using a random number sequence obtained from the output of the LFSR, a random number sequence with even higher randomness may be used for a cryptographic key. Note that the LFSR may be used upon configuring the dedicated hardware, or the LFSR may be realized by software with the use of the CPU 300.

It is also possible to provide the aforementioned authentication function by using the electronic device 200.

The procedure for authentication among devices will be explained. Here, the procedure for authentication will be explained by using an example in which a device P verifies whether or not a device C is genuine, where the device C is a device to be authenticated and the device P is an authentication device.

It is assumed that the same elements as those provided for the electronic device 200 of FIG. 8 are provided for the device P as an authentication device and for the device C as a device to be authenticated. Moreover, it is assumed that the same cryptographic key (secret key) K is shared in common in advance between the device P and the genuine device C. For example, the cryptographic key "K" is stored in advance in the ROM 500 of each of the device P and the device C.

When authentication is performed, firstly, the device P generates random number "r" by using the random number generator 100, and the generated random number "r" is transmitted to the device C by using the communicator 700. Once the device C receives the random number "r" by using the communication unit 700, the device C encrypts the random number "r" with the cryptographic computation unit 400 by using a cryptographic key "K" shared with the device P in common, and returns the obtained encrypted information to the device P by using the communication unit 700. Once the device P receives the encrypted information in return by using the communication unit 700, the device P decrypts the received encrypted information with the cryptographic computation unit 400 by using the cryptographic key "K" shared with the device C in common. Then, the CPU 300 of the device P determines whether or not the information obtained in the decryption process matches the random number "r" transmitted to the device C. When the information obtained in the decryption process matches the random number "r", the CPU 300 of the device P obtains the authentication result indicating that the device C is genuine. On the other hand, when the information obtained in the decryption process does not match the random number "r", the CPU 300 of the device P obtains the authentication result indicating that the device C is not genuine.

As the device P and the device C perform the processes as described above, the device P may authenticate the device C. Note that the device P and the device C may be provided with hardware which is dedicated to the processes described above.

If an attack in which a disguise device C is used by making use of the collection result of the encrypted information returned from the device C to the device P ("replay attack" or the like) is taken into consideration, it is desirable that the random number "r" used for the authentication function be with high randomness as a random number.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A random number generator comprising:
    an exclusive-OR circuit configured to obtain an exclusive-OR of outputs from a plurality of digital circuits;
    a random number determiner configured to determine whether or not an output generated according to an instruction to generate random numbers is a random number for each of the plurality of digital circuits; and
    a random number generation instruction inhibitor configured to inhibit an instruction to generate random numbers to be provided to the plurality of digital circuits whose output generated according to the instruction is determined to be not a random number by the random number determiner.

2. The random number generation circuit according to claim 1, wherein
    the plurality of digital circuits are a plurality of RS latch circuits, and
    the random number determiner examines each of the plurality of RS latch circuits to determine whether or not an output of the each of the plurality of RS latch circuit, when an input by which the each of the plurality of RS latch circuit falls into a metastable state is input to the each of the plurality of RS latch circuit as an instruction to generate random numbers, is a random number.

3. The random number generator according to claim 2, wherein
    the random number determiner repeats observing an output of the RS latch circuit which has gone through the metastable state while inputting an input by which the RS latch circuit falls into a metastable state, and when an observed logic of an output does not change for a specified number of times on a continuous basis, determines that an output of the RS latch circuit is not a random number.

4. The random number generator according to claim 1, wherein
    the random number generation instruction inhibitor controls a digital circuit whose output is determined to be not a random number by the random number determiner to continue inputting a value which invariantly holds a logic of an output of the digital circuit, thereby inhibiting an instruction to generate random numbers.

5. The random number generator according to claim 4, further comprising
    a determination result holder configured to hold a determination result of the random number determiner,
    wherein
    the random number generation instruction inhibitor receives from the determination result holder the determination result of the random number determiner held by the determination result holder, and continues inputting a value which invariantly holds a logic of an output of the digital circuit while providing a digital circuit whose output is determined to be not a random number by the random number determiner with the received determination result.

6. The random number generator according to claim 5, further comprising
    a selector configured to select outputs of the digital circuits on a one-by-one basis and configured to output the selected output,
    wherein
    the determination result holder includes a plurality of D-flip-flop circuits, associated with the digital circuits on a one-to-one basis, configured to hold a determination result of the random number determination unit, and
    the random number determiner performs the determination on a digital circuit whose output is selected by the selector, and controls the D-flip-flop circuit associated with the digital circuit in the determination result holder to hold the determination result.

7. The random number generator according to claim 6, wherein
    the D-flip-flop circuit associated with a digital circuit whose output is determined to be not a random number by the random number determiner in the determination result holder outputs a potential at a low level at binary logic levels having different potentials to the random number generation instruction inhibitor.

8. The random number generator according to claim 7, wherein
    the random number generation instruction inhibitor includes an AND circuit configured to obtain a logical product of a clock signal and an output of the D-flip-flop circuit, and continues inputting a value which invariantly holds a logic of an output of the digital circuit to a digital circuit whose output is determined to be not a random number by the random number determiner by inputting an output of the AND circuit to a digital circuit associated with the D-flip-flop circuit.

9. The random number generator according to claim 5, further comprising a selector configured to select outputs of the digital circuits on a one-by-one basis to output the selected output, wherein the determination result holder includes a plurality of D-latch circuits, associated with the digital circuits on a one-to-one basis, configured to hold a determination result of the random number determination unit, and the random number determiner performs the determination on a digital circuit whose output is selected by the selector, and controls the D-latch circuit associated with the digital circuit in the determination result holder to hold the determination result.

10. An encryption device comprising:

a random number generator configured to include:
  an exclusive-OR circuit configured to obtain an exclusive-OR of outputs from a plurality of digital circuits;
  a random number determiner configured to determine whether or not an output generated according to an instruction to generate random numbers is a random number for each of the plurality of digital circuits; and
  a random number generation instruction inhibitor configured to inhibit an instruction to generate random numbers to be provided to the plurality of digital circuits whose output generated according to the instruction is determined to be not a random number by the random number determiner; and an encryption processor configured to encrypt information by using a sequence of random numbers generated by the random number generator as a cryptographic key.

11. An authentication device comprising:

a random number generator configured to include:
  an exclusive-OR circuit configured to obtain an exclusive-OR of outputs from a plurality of digital circuits;
  a random number determiner configured to determine whether or not an output generated according to an instruction to generate random numbers is a random number for each of the plurality of digital circuits; and
  a random number generation instruction inhibitor configured to inhibit an instruction to generate random numbers to be provided to the plurality of digital circuits whose output generated according to the instruction is determined to be not a random number by the random number determiner;

a communicator configured to transfer and receive various types of information by communicating with a device to be authenticated;

a decryption processor configured to perform a decryption process on encrypted information by using a specified cryptographic key shared with a genuine device to be authenticated in common; and an authentication processor configured to perform an authentication process on the device to be authenticated according to information obtained by a decryption process of the decryption processor, wherein the communicator receives encrypted information transmitted from the device to be authenticated by which a sequence of random numbers generated by the random number generator is received when the sequence of random numbers is transmitted to the device to be authenticated, the encrypted information being obtained by performing an encryption process on the sequence of random numbers by the device to be authenticated, the decryption processor performs the decryption process on the encrypted information received by the communicator, and the authentication processor determines in the authentication process as to whether or not decryption information obtained by the decryption processor performing the decryption process on the encrypted information received by the communicator matches a sequence of random numbers transmitted to the device to be authenticated, and when it is determined that the decryption information matches the sequence of random numbers, obtains an authentication result indicating that the device to be authenticated is genuine.

* * * * *